(12) United States Patent
Randall

(10) Patent No.: US 12,503,995 B2
(45) Date of Patent: Dec. 23, 2025

(54) MODULAR WIND TURBINE BLADE

(71) Applicant: Vestas Wind Systems A/S, Aarhus N. (DK)

(72) Inventor: Stephen Randall, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/721,922

(22) PCT Filed: Dec. 20, 2022

(86) PCT No.: PCT/DK2022/050291
§ 371 (c)(1),
(2) Date: Jun. 20, 2024

(87) PCT Pub. No.: WO2023/117011
PCT Pub. Date: Jun. 29, 2023

(65) Prior Publication Data
US 2025/0059945 A1    Feb. 20, 2025

(30) Foreign Application Priority Data
Dec. 21, 2021   (DK) ............................ PA 2021 70648

(51) Int. Cl.
*F03D 1/06*   (2006.01)
(52) U.S. Cl.
CPC ...... *F03D 1/0677* (2023.08); *F05B 2240/302* (2013.01)
(58) Field of Classification Search
CPC ....... Y02E 10/72; F03D 1/0675; F03D 13/10; F03D 1/065; F03D 1/0633; F03D 1/0677;
(Continued)

(56) References Cited

U.S. PATENT DOCUMENTS 7,922,454 B1 *  4/2011  Riddell .................. F03D 80/30
                                                416/224
7,998,303 B2 *  8/2011  Baehmann ............ F03D 1/0675
                                                156/305
(Continued)

FOREIGN PATENT DOCUMENTS

EP    2778393 A2    9/2014
EP    2815861 A1   12/2014
(Continued)

OTHER PUBLICATIONS

Danish Patent and Trademark Office, technical examination issued in corresponding DK Application No. PA 2021 70648, dated May 25, 2022.
(Continued)

*Primary Examiner* — Eric J Zamora Alvarez
(74) *Attorney, Agent, or Firm* — Wood Herron & Evans LLP

(57) ABSTRACT

A wind turbine blade includes first and second blade modules. The first module includes a first spar cap, and the second module includes a second spar cap. The first spar cap has a tapered end portion where the thickness decreases towards the end of the first spar cap. The blade further includes a connecting element having a first tapered end portion where the thickness decreases towards a first end of the connecting element. The first spar cap and the connecting element each include (i) an intermediate thickness band; (ii) an inner thickness band; (iii) an outer thickness band. A tapered end of the inner thickness band and/or a tapered end of the outer thickness band of the first spar cap has a lower rate of taper than a tapered end of the intermediate thickness band of the first spar cap.

15 Claims, 6 Drawing Sheets

(58) Field of Classification Search
CPC ...... F03D 1/0641; F03D 1/0681; F03D 80/00; F03D 1/0658; F03D 1/066; F05B 2240/302; F05B 2280/6003; F05B 2230/60; F05B 2250/292; F05B 2230/23; F05B 2230/80; F05B 2240/307; F05B 2260/301; F05B 2280/6015; F05B 2230/604; F05B 2240/2211; F05B 2250/71; F05B 2280/6013; F05B 2230/50; F05B 2240/221; F05B 2240/301; F05B 2260/30; F01D 5/282; F01D 5/12; F01D 5/147

See application file for complete search history.

(56) References Cited

U.S. PATENT DOCUMENTS

| | | | |
|---|---|---|---|
| 8,764,401 B2* | 7/2014 | Hayden | F03D 1/0633 |
| | | | 416/224 |
| 9,297,357 B2* | 3/2016 | Busbey | F03D 1/065 |
| 9,920,630 B2* | 3/2018 | Dahl | F01D 5/12 |
| 10,273,937 B2* | 4/2019 | Hayden | B29C 65/5014 |
| 10,451,030 B2* | 10/2019 | Hayden | B29C 70/00 |
| 10,502,181 B2* | 12/2019 | Danielsen | F03D 1/0641 |
| 10,920,743 B2* | 2/2021 | Danielsen | B29C 66/12261 |
| 11,028,825 B2* | 6/2021 | Hunter | F03D 1/0675 |
| 11,286,908 B2* | 3/2022 | Lund-Laverick | F03D 1/0675 |
| 12,078,143 B2* | 9/2024 | Buchbjerg | B29C 66/1142 |
| 12,152,561 B2* | 11/2024 | Hurup | B29D 99/0028 |
| 12,241,448 B2* | 3/2025 | Razeghi | F03D 1/0675 |
| 2008/0069699 A1 | 3/2008 | Bech | |
| 2011/0211971 A1* | 9/2011 | Bendel | F03D 1/0675 |
| | | | 416/241 R |
| 2014/0169978 A1* | 6/2014 | Livingston | F03D 1/0675 |
| | | | 264/263 |
| 2017/0342959 A1 | 11/2017 | Hayden et al. | |
| 2018/0171968 A1* | 6/2018 | Hunter | F03D 1/0675 |
| 2019/0055921 A1 | 2/2019 | Danielsen | |
| 2020/0217210 A1* | 7/2020 | Lull | F03D 80/00 |
| 2021/0086463 A1* | 3/2021 | Barton | B29C 66/721 |
| 2021/0324830 A1* | 10/2021 | Hunter | F03D 1/0633 |

FOREIGN PATENT DOCUMENTS

| | | |
|---|---|---|
| EP | 3098062 A1 | 11/2016 |
| EP | 3098440 A1 | 11/2016 |
| WO | 2012004571 A2 | 1/2012 |
| WO | 2016198075 A1 | 12/2016 |

OTHER PUBLICATIONS

International Searching Authority, International Search Report and Written Opinion issued in corresponding PCT Application No. PCT/DK/2022/050291, dated Mar. 30, 2023.

* cited by examiner

MODULAR WIND TURBINE BLADE

TECHNICAL FIELD

The present invention relates generally to wind turbine blades and more specifically to a modular wind turbine blade.

BACKGROUND

There is a continuing desire to generate increased levels of power from onshore and offshore wind farms. One way to achieve this is to provide modern wind turbines with larger wind turbine blades. The provision of larger blades increases the swept area of the rotor, allowing the wind turbine to capture more energy from the wind. However, transportation of large components, in particular long wind turbine blades, can be challenging. To overcome this challenge, the blades may be designed as a modular assembly, wherein a blade is formed of two or more blade modules that are easier to transport and which are connected together at the wind farm site to form the blade.

However, providing a blade as a modular assembly introduces a number of other challenges. For example, modern wind turbine blades typically include a reinforcing spar structure to provide structural support to an outer shell of the blade. A spar structure typically comprises longitudinally extending spar caps that absorb bending loads experienced by the blade in use. However, in a modular blade the spar caps may be split at the joint between the blade modules, and the paths for absorbing and transferring loads may therefore be interrupted.

In order to reduce stress concentrations at the joint between the blade modules, interfacing ends of the spar caps may be tapered to form a scarf joint. However, the joint must be configured to withstand and transfer the high bending loads experienced by the blade in use. As such, the spar caps may be configured with a very shallow taper, i.e. a shallow gradient such as 1 in 100 (1:100) to gradually transfer loads between the spar caps, and to provide a large surface area for bonding the tapered ends to one another. However, such long joints, which may extend over 10 m in length in some examples, can be difficult to manufacture accurately, and can be challenging to assemble on-site.

It is against this background that the present invention has been devised.

SUMMARY

According to the present invention there is provided a modular wind turbine blade comprising first and second blade modules connectable together to form at least part of the wind turbine blade, each blade module comprising an outer shell defining a pressure side and a suction side of the wind turbine blade. The first blade module comprises a first spar cap, and the second blade module comprising a second spar cap. The first spar cap has a tapered end portion in which the thickness of the first spar cap decreases towards the end of the first spar cap. The modular wind turbine blade further comprises an elongate connecting element for connecting the first and second blade modules together. The connecting element has a first tapered end portion in which the thickness of the connecting element decreases towards a first end of the connecting element. The first tapered end portion is configured for bonding to the tapered end portion of the first spar cap. The first spar cap has an inner surface and an outer surface, the thickness being defined between the inner surface and the outer surface. The first spar cap comprises (i) an intermediate thickness band; (ii) an inner thickness band between the intermediate thickness band and the inner surface; and (iii) an outer thickness band between the intermediate thickness band and the outer surface. Each of the thickness bands have a tapered end within the tapered end portion of the first spar cap. The connecting element has an inner surface and an outer surface, the thickness of the connecting element being defined between the inner surface and the outer surface. The connecting element comprises (i) an intermediate thickness band; (ii) an inner thickness band between the intermediate thickness band and the inner surface; and (iii) an outer thickness band between the intermediate thickness band and the outer surface. Each of the thickness bands has a tapered end within the first tapered end portion of the connecting element. The tapered end of the inner thickness band and/or the tapered end of the outer thickness band of the first spar cap has a lower rate of taper than the tapered end of the intermediate thickness band of the first spar cap. Additionally or alternatively, the tapered end of the inner thickness band and/or the tapered end of the outer thickness band of the connecting element has a lower rate of taper than the tapered end of the intermediate thickness band of the connecting element.

A modular wind turbine blade configured in this way, i.e. with a spar cap and connecting element each having tapered ends of their inner and/or outer thickness bands that taper at a lower rate of taper than the tapered ends of their respective intermediate thickness bands, facilitates the provision of a joint connecting the first and second blade modules that extends over a shorter spanwise distance than a joint with comparable structural performance having a uniform taper.

Non-uniform loading of the spar cap and connecting element in use, whereby the inner and outer thickness bands experience higher loading than the intermediate thickness bands, enables the use of the improved joint wherein the spar cap and connecting element each have a non-uniform taper in their respective tapered end portions. The more highly-loaded inner and/or outer thickness bands have a lower rate of taper than the intermediate thickness bands to transfer the higher loads more gradually between the spar cap and connecting element. The lower rate of taper is advantageous for transferring loads between the spar cap and connecting element, however, such a low rate of taper is not required for the intermediate thickness bands which take up and transfer lower loads in use. As such, the intermediate thickness bands have a higher rate of taper than the inner and/or outer thickness bands. The higher rate of taper reduces the spanwise extent of the tapered end of the intermediate portion, thereby reducing the spanwise extent of the joint between the first and second blade module.

Providing a joint with a shorter spanwise extent is advantageous for transport, handling and assembly of the modular blade parts because the connecting element may be shorter in length than a typical connecting element having a uniform rate of taper. Further, a shorter joint may require less preparation work before bonding the connecting element to the spar cap on-site. Additionally, a shorter joint may reduce the risk of defects occurring in the joint, for example by reducing the risk of introducing foreign particles into adhesive used to bond the connecting element to the spar cap.

The tapered end of the intermediate thickness band of the first spar cap preferably tapers at a higher rate than the tapered end(s) of the inner and/or outer thickness bands of the first spar cap.

The tapered end(s) of the inner and/or outer thickness band of the first spar cap preferably have a relatively shallow taper, whilst the tapered end of the intermediate thickness band preferably has a relatively steep taper. The tapered end of the intermediate thickness band of the first spar cap is preferably more steeply inclined than the tapered end(s) of the inner and/or outer thickness band.

The tapered end(s) of the inner and/or outer thickness bands of the first spar cap preferably have a lower taper angle than the tapered end of the intermediate thickness band of the first spar cap. The tapered end of the intermediate thickness band of the first spar cap preferably has a higher taper angle than the tapered end(s) of the inner and/or outer thickness bands of the first spar cap.

The tapered end of the intermediate thickness band of the connecting element preferably tapers at a higher rate than the tapered end(s) of the inner and/or outer thickness bands of the connecting element.

The tapered end(s) of the inner and/or outer thickness band of the connecting element preferably have a relatively shallow taper, whilst the tapered end of the intermediate thickness band preferably has a relatively steep taper. The tapered end of the intermediate thickness band of the connecting element is preferably more steeply inclined than the tapered end(s) of the inner and/or outer thickness band.

The tapered end(s) of the inner and/or outer thickness bands of the connecting element preferably have a lower taper angle than the tapered end of the intermediate thickness band of the connecting element. The tapered end of the intermediate thickness band of the connecting element preferably has a higher taper angle than the tapered end(s) of the inner and/or outer thickness bands of the connecting element.

The first spar cap therefore has an end portion having a non-uniform taper because the intermediate thickness band of the spar cap has a different rate of taper compared to the inner and/or outer thickness bands in the end portion of the spar cap. Similarly, the connecting element has a first end portion having a non-uniform taper because the intermediate thickness band of the connecting element has a different rate of taper compared to the inner and/or outer thickness bands in the end portion of the connecting element.

The first blade module is one of an inboard or outboard blade module. The second blade module is the other of an inboard or outboard blade module. The first blade module may include one of a root or a tip of the wind turbine blade. The second blade module may include the other of a root or a tip of the wind turbine blade. Alternatively, the modular blade may comprise one or more additional blade modules comprising the root or tip of the wind turbine blade.

The first spar cap extends longitudinally in a spanwise direction of the first blade module. The second spar cap extends longitudinally in a spanwise direction of the second blade module. The first and second spar caps are connected together when the modular blade is assembled.

It will be appreciated that the joint between the first and second spar caps may be a scarf joint. The connection between the first and second blade modules may be formed by one or more such scarf joints. Preferably each blade module includes a plurality of spar caps. Preferably the first and second blade modules are connected by one or more scarf joint connections in each spar cap.

The connecting element may comprise a tapered end portion of the second spar cap extending from the second blade module. For example, the first and second spar caps may be connected via a single scarf joint. Advantageously, such a configuration facilitates connection of the first and second blade modules using a single joint for each connecting element. This reduces the preparation and assembly work required on-site when assembling the modular blade.

The tapered end portion of the first spar cap may define a tapered recess in the first blade module. In that case, the first tapered end portion of the connecting element is preferably configured to fit within the tapered recess of the first blade module. The first tapered end portion of the connecting element is preferably bonded within said tapered recess. The tapered recess may advantageously provide a clearly defined region for receiving adhesive to bond the connecting element to the first spar cap when assembling the blade.

Alternatively, the tapered end portion of the first spar cap may also extend from the first blade module and the two spar caps may be connected together by a single scarf joint in a region between the first and second blade modules. Such a configuration may facilitate improved inspection of the bonded joint during assembly of the blade. A fairing may subsequently be provided around this part of the blade comprising the joint.

The second spar cap may have a tapered end portion. The connecting element may be separate from the first and second blade modules. The connecting element may further comprise a second tapered end portion. The first and second tapered end portions of the connecting element may be configured for bonding to the respective tapered end portions of the first and second spar caps. For example, the first and second spar caps may be connected via a double scarf joint. The separate connecting element may be referred to as a spar bridge. Advantageously, such a double scarf spar bridge configuration may facilitate a robust connection between the first and second blade modules without requiring one or more of the blade modules to have a connecting element extending from the blade module. Such a configuration may therefore simplify manufacture of the blade modules and reduce the risk of damage to components of the modular blade during transport and/or assembly. Further, such a configuration may facilitate greater flexibility in aligning the first and second blade modules and improved handling during assembly of the modular blade.

The tapered end portion of the second spar cap may define a tapered recess in the second blade module. In such an example, the second tapered end portion of the connecting element is preferably configured to fit within the tapered recess of the second blade module. The second tapered end portion of the connecting element is preferably bonded within said tapered recess. The tapered recess may advantageously provide a clearly defined region for receiving adhesive to bond the connecting element to the second spar cap when assembling the blade.

The tapered end portion of the second spar cap and the second tapered end portion of the connecting element may be configured in the same way as the tapered end portion of the first spar cap and the first tapered end portion of the connecting element. For example, the thickness of each may comprise inner, outer and intermediate thickness bands with different taper angles in the thickness bands. Repetition of the equivalent features is avoided purely for reasons of conciseness. Likewise, in the following description, additional features are only described in connection with the first spar cap and the first tapered end of the connecting element, but equivalent features may be associated with the second spar cap and second end of the connecting element. However, it should be appreciated that the various rates of taper and the taper angles at the interface between the connecting element and the first spar cap may be the same or different to the various rates of taper and taper angles at the interface between the connecting element and the second spar cap.

The inner and/or outer thickness band of the first spar cap may each have a thickness of between 5% to 25% of the total thickness of the first spar cap, and the intermediate thickness band of the first spar cap may have a thickness of between 50% to 90% of the total thickness of the first spar cap. That is to say, the inner thickness band of the first spar cap may have a thickness of between 5% to 25% of the total thickness of the first spar cap, and/or the outer thickness band of the first spar cap may have a thickness of between 5% to 25% of the total thickness of the first spar cap, in some examples. In preferred examples, the inner thickness band of the first spar cap may have a thickness of less than 15% of the total thickness of the first spar cap, for example the inner thickness band may have a thickness of 12.5% of the total thickness of the first spar cap. Further, in preferred examples, the outer thickness band of the first spar cap may have a thickness of less than 15% of the total thickness of the first spar cap, for example the outer thickness band may have a thickness of 12.5% of the total thickness of the first spar cap.

Additionally or alternatively the inner and/or outer thickness band of the connecting element may each have a thickness of between 5% to 25% of the total thickness of the connecting element, and the intermediate thickness band of the connecting element may have a thickness of between 5% to 25% of the total thickness of the connecting element. That is to say, the inner thickness band of the connecting element may have a thickness of between 5% to 25% of the total thickness of the connecting element, and/or the outer thickness band of the connecting element may have a thickness of between 5% to 25% of the total thickness of the connecting element, in some examples. In preferred examples, the inner thickness band of the connecting element may have a thickness of less than 15% of the total thickness of the connecting element, for example the inner thickness band may have a thickness of 12.5% of the total thickness of the connecting element. Further, in preferred examples, the outer thickness band of the connecting element may have a thickness of less than 15% of the total thickness of the connecting element, for example the outer thickness band may have a thickness of 12.5% of the total thickness of the connecting element.

The inner thickness band of a spar cap preferably comprises the inner surface of the spar cap. The outer thickness band of a spar cap preferably comprises the outer surface of the spar cap. The intermediate thickness band of a spar cap preferably adjoins the inner and/or the outer thickness bands. In preferred examples, the thickness of the spar cap may be divided into exactly three thickness bands.

The inner thickness band of the connecting element preferably comprises the inner surface of the connecting element. The outer thickness band of the connecting element preferably comprises the outer surface of the connecting element. The intermediate thickness band of the connecting element preferably adjoins the inner and/or the outer thickness bands. In preferred examples, the thickness of the connecting element is divided into exactly three thickness bands.

The first spar cap may be a monolithic component. Additionally or alternatively, the second spar cap may be a monolithic component. Additionally or alternatively, the connecting element may be a monolithic component.

However, in preferred examples, the first spar cap may comprise a stack of layers. Additionally or alternatively in preferred examples the second spar cap may comprise a stack of layers. Additionally or alternatively in preferred examples the connecting element may comprise a stack of layers. Forming the first spar cap and/or second spar cap and/or connecting element of a stack of layers may make it easier to accurately form the tapered end portions in the respective thickness bands with less waste material.

The layers may be pultrusions. For example, the layers may be formed in a pultrusion process. A pultrusion process has high repeatability and may be used to form substantially uniform layers. Preferably, each layer may be a pultruded strip of fibre-reinforced composite material. Preferably the layers may be made of carbon-fibre reinforced polymer (CFRP). CFRP provides a strip with a high tensile strength and low weight relative to other wind turbine blade materials. In other examples, other reinforcing fibres may be used, for example glass fibres (GFRP). In other examples, the layers may be plies of fibrous reinforcing material, such as glass-fibre and/or carbon fibre plies.

The intermediate thickness band of the first spar cap may comprise more layers than the inner thickness band of the first spar cap and/or more layers than the outer thickness band of the first spar cap. Additionally or alternatively, the intermediate thickness band of the connecting element may comprise more layers than the inner thickness band of the connecting element and/or more layers than the outer thickness band of the connecting element.

The inner thickness band of the first spar cap and/or the outer thickness band of the first spar cap may comprise a single layer, and the intermediate portion of the first spar cap may comprise a plurality of layers. Additionally or alternatively, the inner thickness band of the connecting element and/or the outer thickness band of the connecting element may comprise a single layer, and the intermediate portion of the connecting element may comprise a plurality of layers. Such configurations may facilitate easier manufacture of the spar cap and/or connecting element. For example, where the inner and/or outer thickness bands comprise only a single layer, the thickness bands, including their respective tapered ends, may be formed off-line and assembled together to form a spar cap or connecting element with a tapered end portion having a non-uniform taper without requiring a separate manufacturing step to form the non-uniform taper.

The or each layer of the inner and/or outer thickness band of the first spar cap may taper over a longer spanwise length than each layer of the intermediate thickness band of the first spar cap. Additionally or alternatively, the or each layer of the inner and/or outer thickness band of the connecting element may taper over a longer spanwise length than each layer of the intermediate thickness band of the connecting element. Tapering over a longer spanwise length advantageously facilitates a more gradual transfer of loads between corresponding layers of the spar cap and connecting element.

The tapered end of the inner thickness band and/or the tapered end of the outer thickness band of the first spar cap may define a curved taper. Additionally or alternatively, the tapered end of the inner thickness band and/or the tapered end of the outer thickness band of the connecting element may define a curved taper. A curved taper may advantageously minimise the risk of stresses concentrating at the interface between the inner and/or outer thickness bands and a respective intermediate thickness band by smoothly transitioning between a shallow taper and the steeper taper of the intermediate thickness band. In particular, a curved taper may advantageously approximate the distribution of stresses/loads in the spar cap and/or connecting element more closely, such that the compromise between joint length and the strength of the joint may be optimised in accordance with the distribution of stresses.

The tapered end of the inner thickness band of the first spar cap may define a curved taper that is curved in an opposite sense to a curved taper of the tapered end of the inner thickness band of the connecting element. Additionally or alternatively, the tapered end of the outer thickness band of the first spar cap may define a curved taper that is curved in an opposite sense to a curved taper of the tapered end of the outer thickness band of the connecting element.

The tapered end of the intermediate thickness band of the first spar cap may define a linear taper. Additionally or alternatively, the tapered end of the intermediate thickness band of the connecting element may define a linear taper. In some examples, the or each layer making up the inner and/or outer thickness band of the first spar cap or connecting element may have a curved taper, and each layer of the intermediate portion may have a linear taper. A linear taper may be easier to manufacture than a curved or variable taper. Providing an intermediate thickness band, which is required to transfer proportionally less load than the inner and/or outer thickness band, with a linear taper may make manufacture of the spar cap and/or connecting element easier without compromising the load bearing capacity of the joint.

The tapered ends of the inner, outer and intermediate thickness bands of the first spar cap may together define a generally S-shaped or Z-shaped profile at the end of the first spar cap. Additionally or alternatively, the tapered ends of the inner, outer and intermediate thickness bands of the connecting element may together define a generally S-shaped or Z-shaped profile at the first end of the connecting element.

The modular wind turbine blade may further comprise an outer patch applied over an interface between the outer thickness band of the connecting element and the outer thickness band of the first spar cap. Additionally or alternatively, the modular wind turbine blade may further comprise an inner patch applied over an interface between the inner thickness band of the connecting element and the inner thickness band of the first spar cap. Advantageously, a patch may help to resist peel loads which act to separate the first tapered end portion of the connecting element from the first spar cap in use, and/or to separate the tapered end portion of the first spar cap from the connecting element in use.

Further, a patch may provide an additional load path across the joint between the connecting element and the spar cap. For example, the or each patch may comprise a stack of plies of fibrous reinforcing material. Reinforcing fibres in the fibrous reinforcing material may transfer a proportion of the loads between the spar cap and the connecting element.

BRIEF DESCRIPTION OF THE DRAWINGS

Examples of the present invention will now be described by way of non-limiting example only, with reference to the accompanying figures, in which.

DETAILED DESCRIPTION

Figure 1:
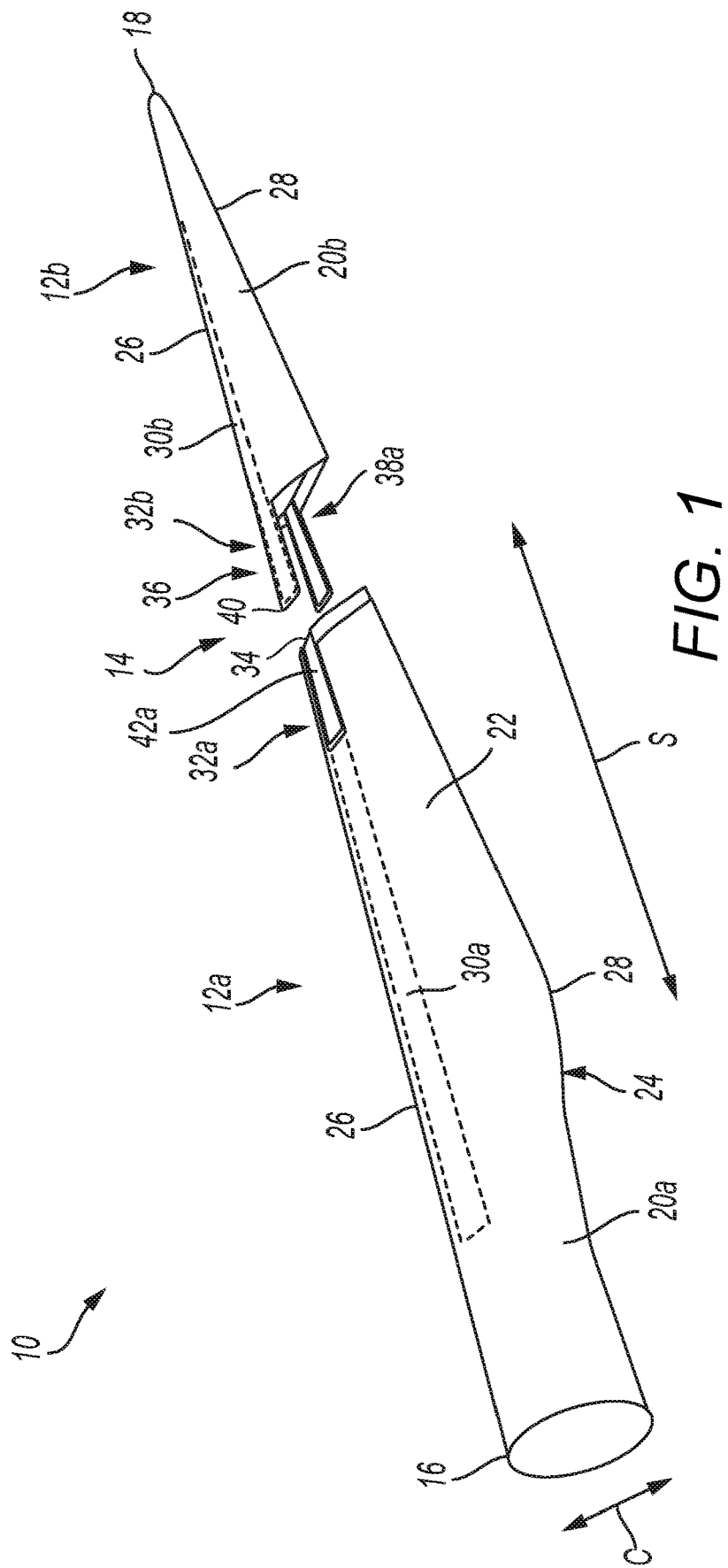
FIG. 1 is a schematic exploded view of an example of modular wind turbine blade comprising a first blade module, a second blade module, and an elongate connecting element extending from the second blade module.

FIG. 1 is a schematic exploded view of a modular wind turbine blade 10. The blade 10 comprises a first blade module 12a and a second blade module 12b. The first and second blade modules 12a, 12b are connectable together to form at least part of the wind turbine blade 10. As such, the first and second blade modules 12a, 12b may be connected together at a joint 14.

In some examples, as shown in FIG. 1, the first blade module 12a may comprise a blade root 16 configured for connecting the blade 10 to a hub of a wind turbine (not shown), and the second blade module 12b may comprise a tip 18 of the wind turbine blade 10. In other examples (not shown), at least one of the first or second blade modules 12a, 12b may be an intermediate blade module and may not comprise a root 16 or tip 18 of the blade 10.

The first and second blade modules 12a, 12b each comprise an outer shell 20a, 20b defining a pressure side 22 and a suction side 24 of the wind turbine blade 10. The outer shell 20a, 20b of each blade module 12a, 12b extends in a spanwise direction (S) between the blade root 16 and the tip 18, and in a chordwise direction (C) between a leading edge 26 and a trailing edge 28.

The first blade module 12a comprises a first spar cap 30a, and the second blade module 12b comprises a second spar cap 30b. The spar caps 30a, 30b may form part of a structural spar that provides support to the outer shells 20a, 20b in use. The first and second spar caps 30a, 30b may be integrated with the respective outer shells 20a, 20b of the first and second blade modules 12a, 12b. Alternatively, the first and/or second spar cap 30a, 30b may be connected to an inner surface of the respective outer shell 20a, 20b of the first or second blade module 12a, 12b.

The first spar cap 30a has a tapered end portion 32a configured to facilitate an improved connection between the first and second blade modules 12a, 12b as will be described in more detail later with reference to FIG. 3. Accordingly, the thickness of the first spar cap 30a decreases towards the end 34 of the first spar cap 30a (shown in more detail in FIG. 3).

The modular wind turbine blade 10 further comprises an elongate connecting element 36 for connecting the first and second blade modules 12a, 12b. The connecting element 36 has a first tapered end portion 38a and the thickness of the connecting element 36 therefore decreases towards a first end 40 of the connecting element 36. The first tapered end portion 38a of the connecting element 36 is configured for bonding to the tapered end portion 32a of the first spar cap 30a. Further details of the first spar cap 30a and the elongate connecting element 36 will be described in more detail below with reference to FIGS. 3 and 4.

In some examples, the connecting element 36 may comprise a tapered end portion 32b of the second spar cap 30b. As shown in FIG. 1, the tapered end portion 32b of the second spar cap 30b may extend from the second blade module 12b. Complementary, the tapered end portion 32a of the first spar cap 30a may define a tapered recess 42a in the first blade module 12a. The first tapered end portion 38a of the connecting element 36 is preferably configured to fit within the tapered recess 42a of the first blade module 12a. Accordingly, the modular wind turbine blade 10 may comprise a single scarf joint 14 connecting the first and second spar caps 30a, 30b.

Whilst the connecting element 36 may be part of the second blade module 12b in some examples as shown in FIG. 1, in other examples, the modular wind turbine blade 10 may comprise one or more connecting elements 36 that are separate from both the first and second blade modules 12a, 12b.

Figure 2:
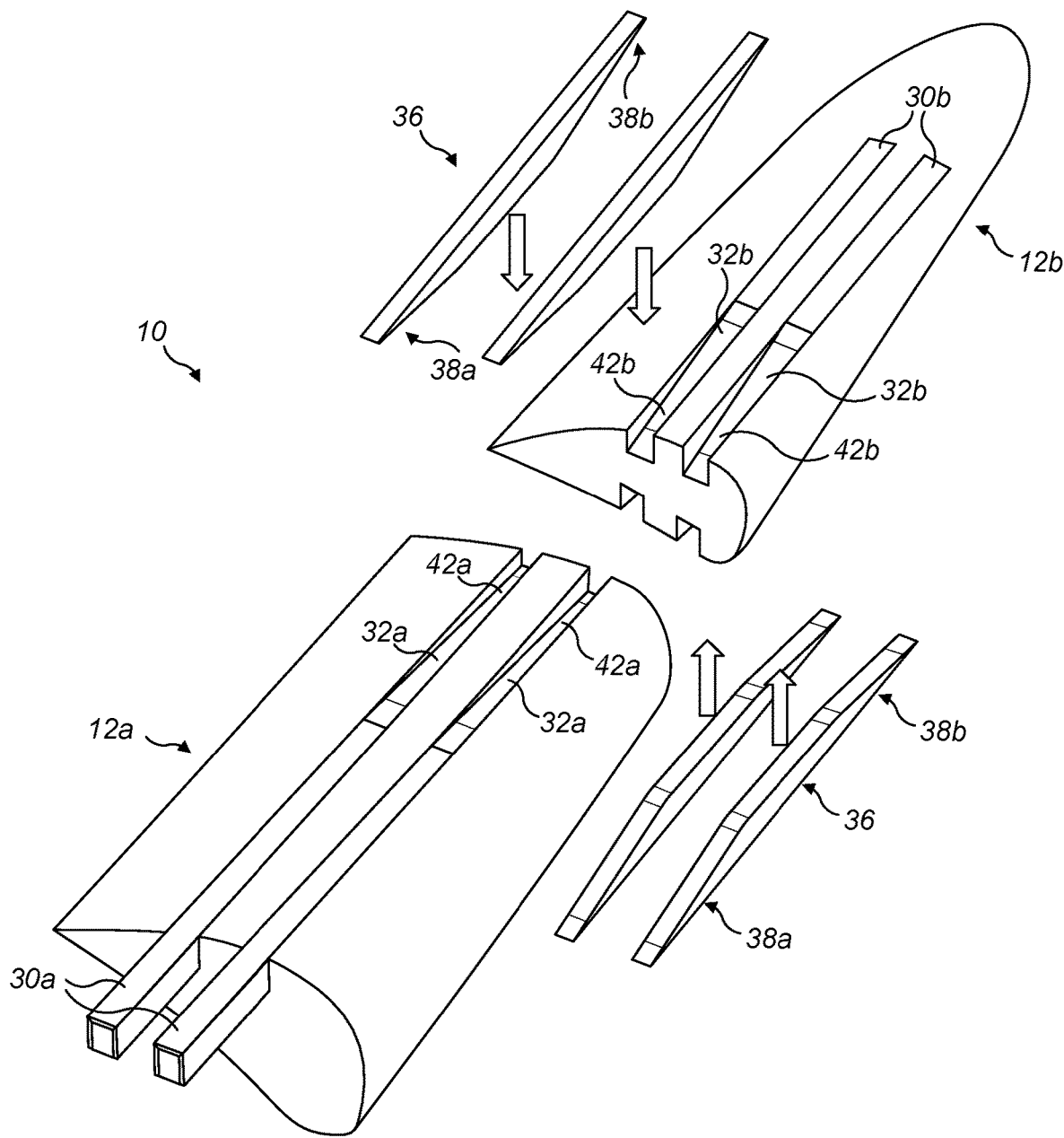
FIG. 2 is a schematic exploded view of an example of a modular wind turbine blade comprising a separate connecting element configured for connecting the first and second blade modules.

For example, FIG. 2 shows a schematic exploded view of an example of a modular wind turbine blade 10 wherein the connecting element 36 is a separate part that is connected to both the first and second blade modules 12a, 12b. It will be appreciated that equivalent features previously described with reference to FIG. 1 will not be repeated here for conciseness.

Referring to FIG. 2, in examples wherein the connecting element 36 is a separate part, the connecting element 36 may comprise a second tapered end portion 38b in addition to the first tapered end portion 38a. The first and second tapered end portions 38a, 38b of the connecting element 36 are preferably configured for bonding to the respective tapered end portions 32a, 32b of the first and second spar caps 30a, 30b. As such, the first and second spar caps 30a, 30b may be connected via a double scarf joint, whereby the connecting element 36 forms a separate scarf joint 14 with each of the first and second spar caps 30a, 30b. The connecting element 36 may be referred to as a "spar bridge" in such examples.

In examples comprising a separate connecting element 36, the tapered end portion 32b of the second spar cap 30b may not extend from the second blade module 12b. Instead, the tapered end portion 32b of the second spar cap 30b may define a tapered recess 42b in the second blade module 12b. The second tapered end portion 38b of the connecting element 36 is preferably configured to fit within the tapered recess 42b of the second blade module 12b in such an example.

Figure 3:
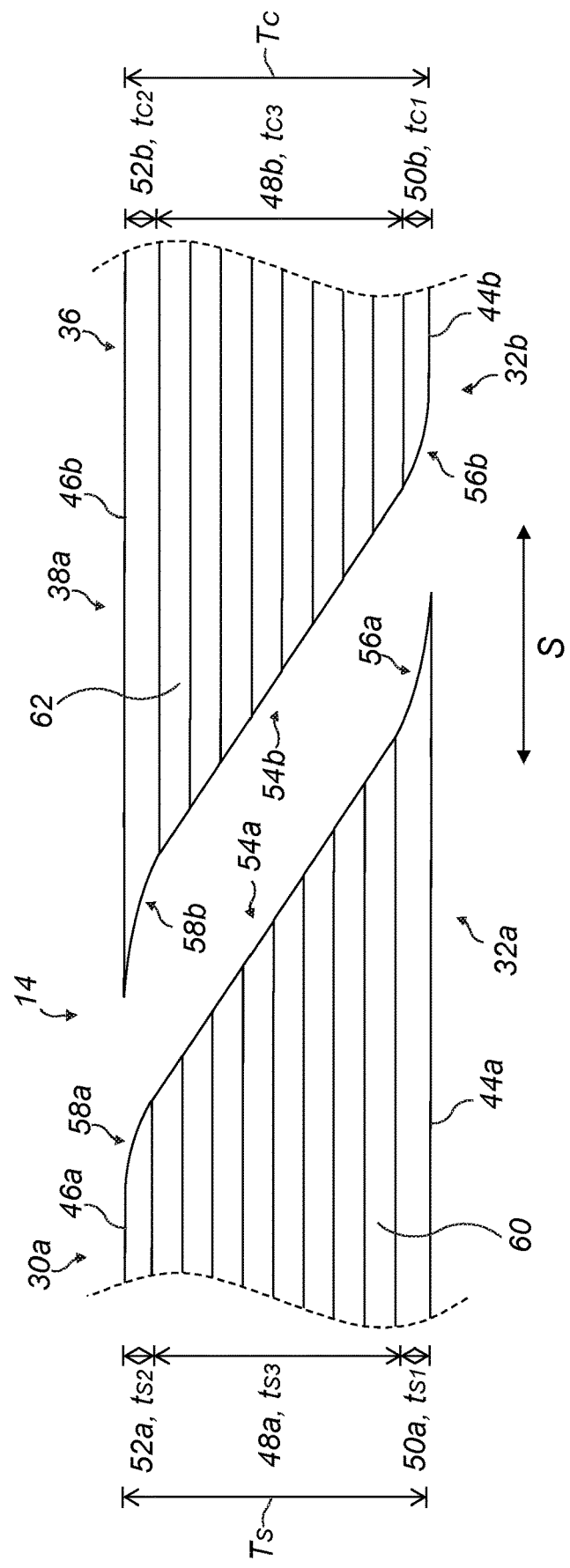
FIG. 3 is a schematic cross-sectional view of a tapered end portion of the connecting element and a tapered end portion of a spar cap of the first blade module.

FIG. 3 shows a schematic cross-sectional view of an example of a joint 14 between the first tapered end portion 38a of the connecting element 36 and the tapered end portion 32a of the first spar cap 30a. The connecting element 36 and the first spar cap 30a are spaced apart in the spanwise direction (S) in FIG. 3 for clarity. However, it will be understood that the tapered end portions 32a, 38a of the first spar cap 30a and the connecting element 36 are configured for connection to one another. In an assembled modular wind turbine blade 10, it will be understood that the first tapered end portion 38a of the connecting element 36 and the tapered end portion 32a of the first spar cap 30a may be bonded together by adhesive (not shown).

The outer shells 20a, 20b of the first and second blade modules 12a, 12b are not shown in FIG. 3. It should be understood that FIG. 3 merely represents a schematic cross-sectional view of a joint 14 between the connecting element 36 and the first spar cap 30a. As such, it will be appreciated that the connecting element 36 may comprise a tapered end portion 32b of the second spar cap 30b extending from the second blade module 12b, as shown in FIG. 1 for example. Alternatively, the connecting element 36 may be separate from the first and second blade modules 12a, 12b, as shown in FIG. 2 for example. The following description of the connecting element 36 and the tapered end portion 32a of the first spar cap 30a is therefore applicable to both previously-described examples of FIGS. 1 and 2.

Referring to FIG. 3, the first spar cap 30a has an inner surface 44a and an outer surface 46a. The thickness $T_S$ of the spar cap 30a is defined between the inner surface 44a and the outer surface 46a. The first spar cap 30a comprises an intermediate thickness band 48a, and an inner thickness band 50a between the intermediate thickness band 48a and the inner surface 44a. The first spar cap 30a also comprises an outer thickness band 52a between the intermediate thickness band 48a and the outer surface 46a. The thickness bands 48a, 50a, and 52a each have a respective tapered end 54a, 56a, 58a within the tapered end portion 32a of the first spar cap 30a.

The tapered end 56a of the inner thickness band 50a and/or the tapered end 58a of the outer thickness band 52a of the first spar cap 30a has a lower rate of taper than the tapered end 54a of the intermediate thickness band 48a of the first spar cap 30a. That is to say the tapered end 54a of the intermediate thickness band 48a has a steeper taper than the tapered end 56a of the inner thickness band 50a and/or the tapered end 58a of the outer thickness band 52a. As shown in FIG. 3, in some examples the tapered ends 56a, 58a of both the inner and outer thickness bands 50a, 52a may have a lower rate of taper than the tapered end 54a of the intermediate thickness band 48a.

Referring now to the connecting element 36 which has an inner surface 44b and an outer surface 46b, the thickness $T_C$ of the connecting element 36 is defined between the inner and outer surfaces 44b, 46b. The connecting element 36 comprises an intermediate thickness band 48b, and an inner thickness band 50b between the intermediate thickness band 48b and the inner surface 44b. The connecting element 36 also comprises an outer thickness band 52b between the intermediate thickness band 48b and the outer surface 46b. The thickness bands 48b, 50b, and 52b each have a respective tapered end 54b, 56b, 58b within the first tapered end portion 38a of the connecting element 36.

Further, still with reference to the connecting element 36, the tapered end 56b of the inner thickness band 50b and/or the tapered end 58b of the outer thickness band 52b has a lower rate of taper than the tapered end 54b of the intermediate thickness band 48b of the connecting element 36. Accordingly, the tapered end 54b of the intermediate thickness band 48b therefore has a steeper taper than the tapered end 56b of the inner thickness band 50b and/or the tapered end 58b of the outer thickness band 52b. In some examples, the tapered ends 56b, 58b of both the inner and outer thickness bands 50b, 52b may have a lower rate of taper than the tapered end 54b of the intermediate thickness band 48b, as shown in FIG. 3.

Configuring the first spar cap 30a and connecting element 36 as described above, i.e. with different rates of taper for the respective inner thickness band tapered ends 56a, 56b and/or outer thickness band tapered ends 58a, 58b compared to the tapered ends 54a, 54b of the intermediate thickness bands 48a, 48b provides a number of advantages. In particular, such a configuration takes advantage of the non-uniform distribution of loads through the thickness $T_S$, $T_C$ of the spar cap 30a and connecting element 36 to provide an advantageous compromise between strength and length of the joint 14.

In use, the inner thickness bands 50a, 50b and outer thickness bands 52a, 52b of the spar cap 30a and connecting element 36 typically take up and transfer higher loads than the intermediate thickness bands 48a, 48b. It is therefore advantageous to provide inner thickness bands 50a, 50b and/or outer thickness bands 52a, 52b having tapered ends 56a, 56b and 58a, 58b with a relatively shallow taper in order to transfer loads between the spar cap 30a and connecting element 36 more gradually, i.e. over a greater spanwise distance. Conversely, because the loads transferred between the respective intermediate thickness bands 48a, 48b are not as high as the loads transferred between the respective inner thickness bands 50a, 50b and outer thickness bands 52a, 52b in use, the intermediate thickness bands 48a, 48b may be configured with tapered ends 54a, 54b having a steeper taper.

This configuration advantageously facilitates the provision of a modular blade joint 14 that extends over a shorter spanwise length, without adversely affecting the strength and load transfer capabilities of the joint 14. In examples such as the modular blade 10 shown in FIG. 1, such a configuration may therefore reduce the spanwise extension of the connecting element 36 from the second blade module 12b, facilitating easier and safer transport of the blade module 12b (i.e. lower risk of damage) and easier assembly of the blade 10. In an example such as the modular blade 10 shown in FIG. 2, the above-described configuration may enable the use of a shorter separate connecting element 36, improving handling of the connecting element 36 and on-site assembly of the blade 10.

With reference still to FIG. 3, and more particularly to the example of the spar cap 30a, the inner and/or outer thickness band 50a, 52a of the spar cap 30a may each have a thickness $t_{S1}$, $t_{S2}$ of between 5% to 25% of the total thickness $T_S$ of the spar cap 30a. The intermediate thickness band 48a of the spar cap 30a preferably has a thickness $t_{S3}$ of between 50% to 90% of the total thickness $T_S$ of the spar cap 30a.

As shown in FIG. 3, the spar cap 30a may comprise a stack of layers 60. For example, the layers 60 in the spar cap 30a may be pultrusions, i.e. strips formed in a pultrusion process. In preferred examples, the layers 60 may be made of carbon-fibre reinforced polymer. The layers 60 may be bonded together with resin (not shown) to form the spar cap 30a.

The intermediate thickness band 48a of the first spar cap 30a preferably comprises more layers 60 than the inner thickness band 50a of the first spar cap 30a. In some examples the intermediate thickness band 48a preferably comprises more layers 60 than the outer thickness band 52a of the first spar cap 30a. As shown in FIG. 3, in some examples it may be particularly advantageous to provide a spar cap 30a having an inner thickness band 50a and/or outer thickness band 52a that comprises only a single layer 60, with the intermediate thickness band 48a of the first spar cap 30a comprising a plurality of layers 60. Such an example may provide a significant reduction in overall length of the joint 14.

In preferred examples, the layers 60 in the spar cap 30a may be the same thickness. Because the intermediate thickness band 48a has a steeper taper, providing a spar cap 30a having more layers 60 in the intermediate thickness band 48a than the inner and/or outer thickness bands 50a, 52a advantageously reduces the spanwise length of the blade joint 14. Further, to form the shallower tapered ends 56a, 58a of the inner and/or outer thickness bands 50a, 52a, in some examples the or each layer 60 of the inner and/or outer thickness band 50a, 52a may taper over a longer spanwise length than each layer 60 of the intermediate thickness band 48a.

With reference now to the connecting element 36 shown by way of example in FIG. 3, the inner and/or outer thickness bands 50b, 52b of the connecting element 36 may each have a thickness $t_{C1}$, $t_{C2}$ of between 5% to 25% of the total thickness $T_C$ of the connecting element 36. Further, the intermediate thickness band 48b of the connecting element 36 may have a thickness $t_{C3}$ of between 50% to 90% of the total thickness $T_C$ of the connecting element 36.

The connecting element 36 may comprise a stack of layers 62 in preferred examples. The layers 62 may be pultrusions that are preferably made of carbon-fibre reinforced polymer. In some examples, the intermediate thickness band 48b of the connecting element 36 may comprise more layers 62 than the inner and/or outer thickness band 50b, 52b of the connecting element 36. For example, the inner and/or outer thickness band 50b, 52b of the connecting element 36 may comprise a single layer 62 as shown in FIG. 3, and the intermediate portion 48b may comprise a plurality of layers 62. In preferred examples, the layers 62 in the connecting element 36 may be the same thickness. Each layer 62 of the inner and/or outer thickness band 50b, 52b of the connecting element 36 preferably tapers over a longer spanwise length than each layer 62 of the intermediate thickness band 48b. As such, the tapered layers 62 of the inner and/or outer thickness bands 50b, 52b form tapered ends 56b, 58b of the inner and/or outer thickness bands 50b, 52b with a shallower taper than the tapered end 54b of the intermediate thickness band 48b.

Referring to both the spar cap 30a and the connecting element 36 shown by way of example in FIG. 3, in some examples the tapered end 56a, 56b of the inner thickness band 50a, 50b of the spar cap 30a and/or connecting element 36 may define a curved taper. In some examples, the outer thickness band 52a, 52b of the spar cap 30a and/or connecting element 36 may also define a curved taper, as shown in FIG. 3.

In some examples, as shown in FIG. 3, the tapered end 54a of the intermediate thickness band 48a of the first spar cap 30a may define a linear taper. For example, in the tapered end portion 32a of the spar cap 30a, the thickness of the spar cap 30a may taper at a substantially uniform rate in the intermediate thickness band 48a. Referring still to FIG. 3, the tapered end 54b of the intermediate thickness band 48b of the connecting element 36 may also define a linear taper.

With reference now additionally to FIGS. 4a to 4d, these figures show a schematic representation of a plurality of different thickness progressions for a tapered end portion 32/38. The tapered end portion 32/38 in FIGS. 4a to 4d may be a tapered end portion 32 of a spar cap 30 or a tapered end portion 38 of the connecting element 36. As such, references to a thickness band 48, 50, 52, or a tapered end 54, 56, 58 apply equally to the corresponding features of the spar cap 30 and connecting element 36.

Figure 4A:
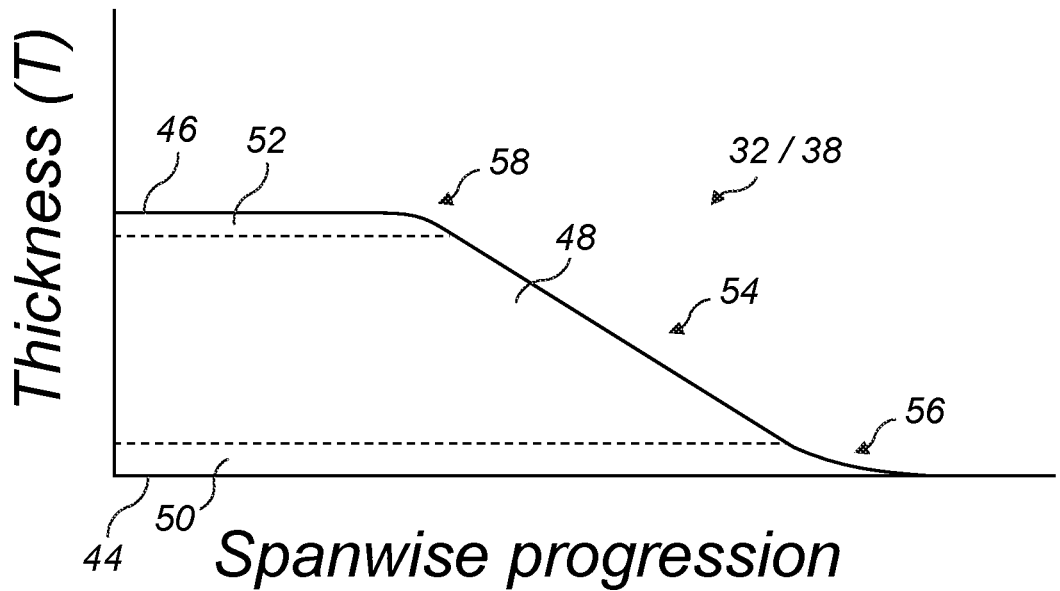
FIGS. 4a to 4d show schematic representations of a plurality of thickness progressions for examples of the tapered end portions of the connecting element and the spar cap.

Referring to FIG. 4a, the tapered ends 54, 56, 58 of the intermediate, inner, and outer thickness bands 48, 50, 52 of the spar cap 30 or connecting element 36 may together define a generally S-shaped profile, as shown also in the example of FIG. 3. A generally S-shaped profile is particularly recognisable in examples wherein the inner and outer thickness bands 50, 52 of the spar cap 30 and/or connecting element 36 define a curved taper.

Figure 4B:
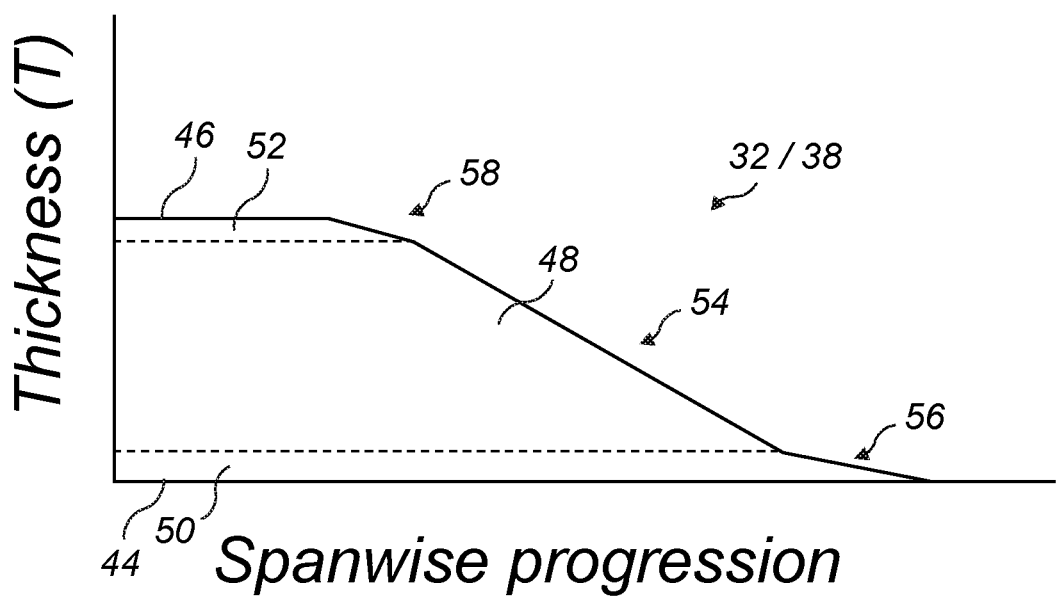

Alternatively, and as shown in FIG. 4b, the tapered ends 54, 56, 58 of the intermediate, inner, and outer thickness bands 48, 50, 52 of the spar cap 30 or connecting element 36 may together define a generally Z-shaped profile in the tapered end portion 32a, 38a of the spar cap 30a and/or connecting element 36. A generally Z-shaped profile is particularly recognisable in examples wherein the inner and outer thickness bands 50, 52 of the spar cap 30 and/or connecting element 36 define a substantially linear taper that has a lower rate of taper than the linear taper of the intermediate thickness band 48.

Figure 4C:
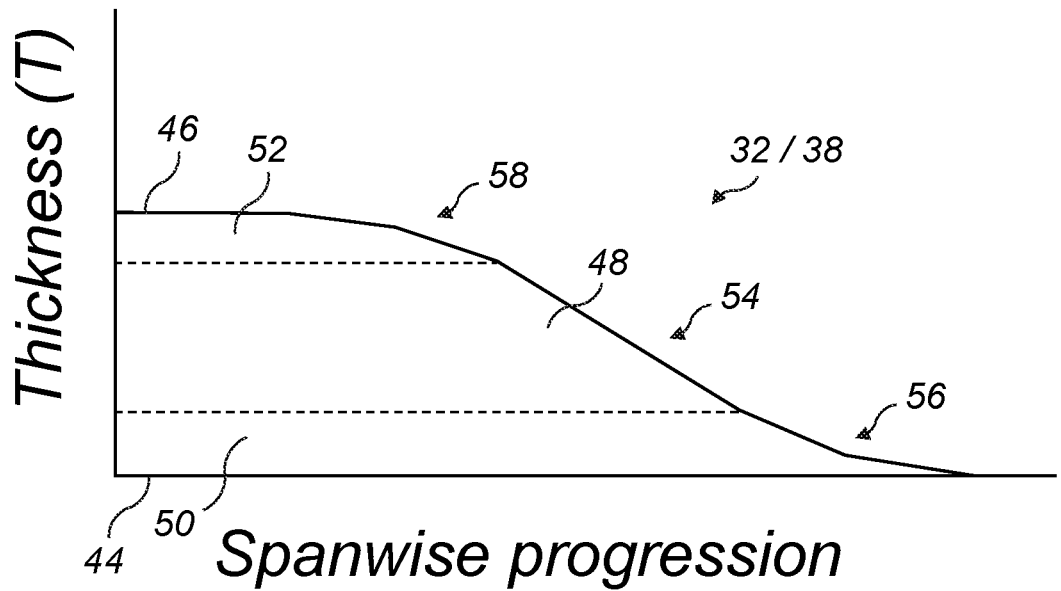

In some examples, as shown in FIG. 4c, the inner and/or outer thickness bands 50, 52 may comprise a plurality of rates of taper. For example, the inner and/or outer thickness band 50, 52 may taper linearly at a first taper rate over a first portion of a respective thickness band, and may taper further at a second taper rate over a second portion of the thickness band. The average rate of taper over the respective inner or outer thickness band 50, 52 is still lower than the rate of taper of the intermediate thickness band 48. Preferably each of the rates of taper in an inner or outer thickness band 50, 52 may be lower than the rate of taper of the intermediate thickness band 48.

Figure 4D:
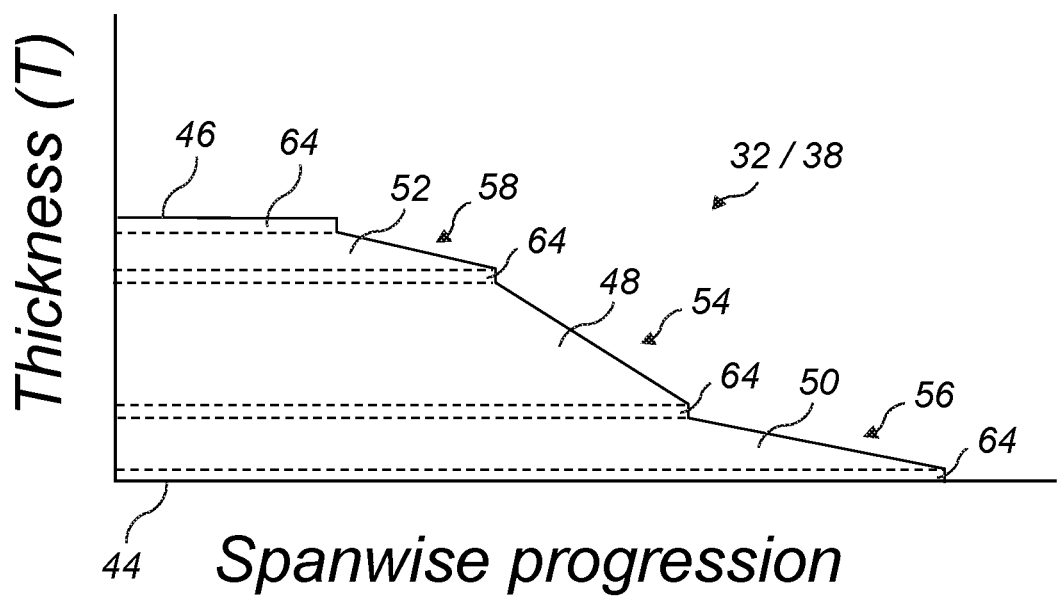

Referring to FIG. 4d, in some examples the spar cap 30 and/or connecting element 36 may comprise one or more additional thickness bands 64. For example, the spar cap 30 and/or connecting element 36 may comprise one or more thickness bands 64 having a non-tapered end. In some examples, such a non-tapered thickness band 64 may be located between the intermediate thickness band 48 and the inner or outer thickness bands 50, 52. In some examples, such non-tapered thickness bands 64 may be located between the inner surface 44 and the inner thickness band 48, and/or between the outer surface 46 and the outer thickness band 52.

It will be appreciated that the orientation of the tapered end portion 32/38 shown in FIGS. 4a to 4d may be different for a tapered end portion 32 of a spar cap 30 and a tapered end portion 38 of a connecting element 36. For example, whilst the line 44 in FIGS. 4a to 4d may represent the inner surface 44 of a spar cap 30, it will be appreciated that line indicated by 44 may equally represent an outer surface 46 of a spar cap 30, an inner surface 44 of a connecting element 36, or an outer surface 46 of a connecting element 36, in other examples. As such it will be appreciated that the thickness progressions shown schematically in FIGS. 4a to 4d are non-dimensional and are applicable to both spar caps 30 and connecting elements 36.

Finally, referring briefly to FIG. 5, which again shows the joint 14, in some examples the blade 10 may comprise an inner patch 66 applied over an interface 68 between the inner thickness band 50a of the first spar cap 30a and the inner thickness band 50b of the connecting element 36. In some examples, the modular wind turbine blade 10 may comprise an outer patch 70 applied over an interface 72 between the outer thickness band 52a of the first spar cap 30a and the outer thickness band 52b of the connecting element 36. The patch 66, 70 may comprise a stack of plies 74 of fibrous material, and may be configured to transfer a proportion of the loads across the joint 14 between the spar cap 30a and the connecting element 36. A patch 66, 70 may additionally help to resist peel loads that act to peel apart the tapered ends 56a, 56b and 58a, 58b of the inner and outer thickness bands 50a, 50b and 52a, 52b when the modular blade 10 is in use.

It will be appreciated that the above description and accompanying figures are provided merely as an example of the present invention. Many alternatives to the specific examples described above are therefore possible without departing from the scope of the invention as defined in the appended claims.

For example, whilst the tapered end portions 32, 38 of the spar cap 30 and connecting element 36 are configured with a complementary shape in the accompanying figures, in some examples, it will be appreciated that configuring the modular wind turbine blade with one or more of the tapered ends 56a, 56b and 58a, 58b of the inner and outer thickness bands 50a, 50b and 52a, 52b of the spar cap 30 and connecting element 36 having a lower rate of taper than the tapered end 54a, 54b of the respective intermediate thickness band 48a, 48b may provide an appreciable reduction in the length of the joint 14 without unduly compromising joint strength.

Figure 5:
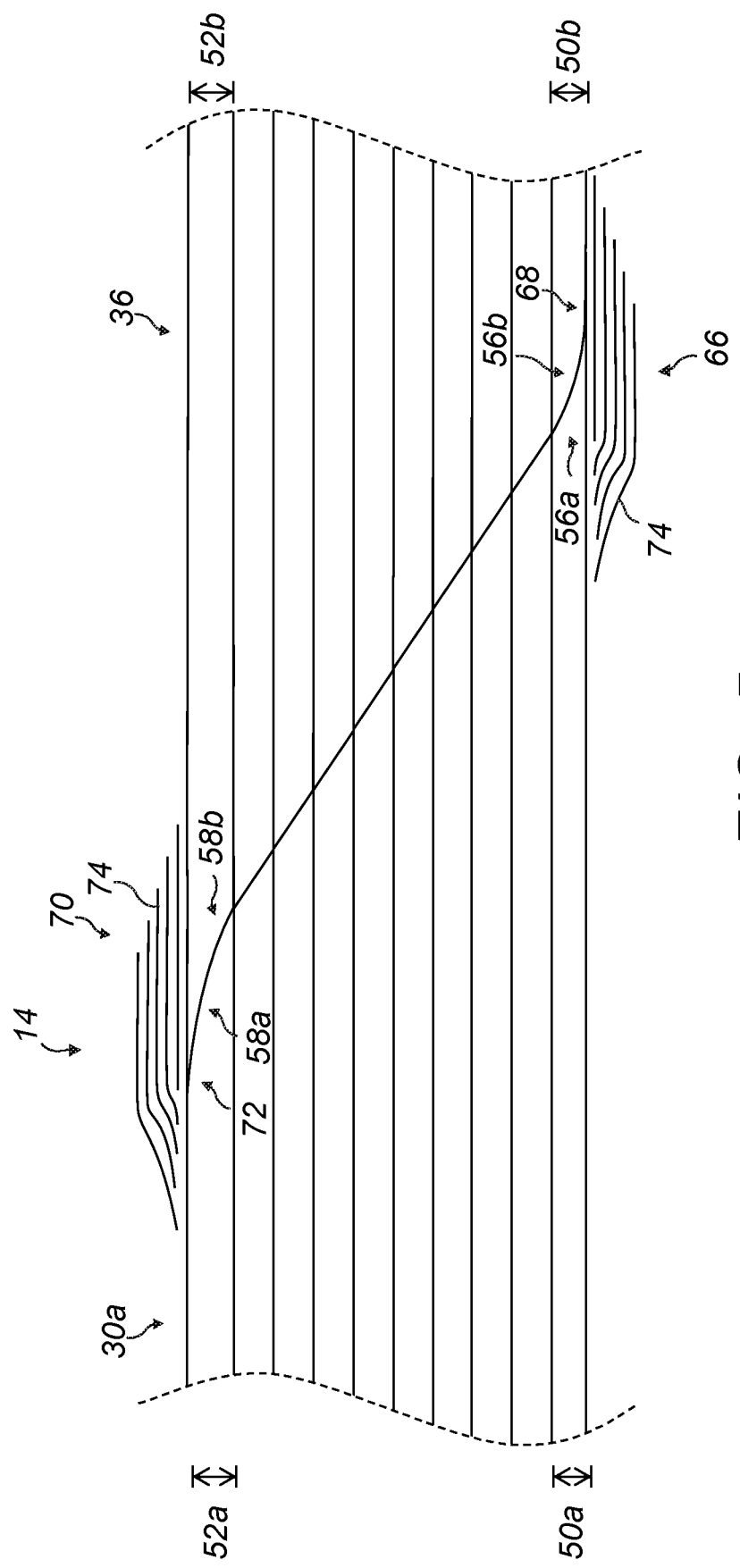
FIG. 5 is a schematic cross-sectional view of a tapered end portion of the connecting element and a tapered end portion of a spar cap of the first blade module.

For example, whilst not shown in FIG. 3 or 5, in some examples the tapered end 56a of the inner thickness band 50a of the spar cap 30 may have a lower rate of taper than the intermediate thickness band tapered end 54a of the spar cap 30, but the tapered end 56b of the inner thickness band 50b of the connecting element 36 may not necessarily have a lower rate of taper than the intermediate thickness band tapered end 54b of the connecting element 36. In such an example the tapered ends 58a, 58b of the outer thickness bands 52a, 52b of the spar cap and connecting element 30, 36 may similarly not necessarily have a lower rate of taper than the tapered ends 54a, 54b of the respective intermediate thickness bands 48a, 48b. That is to say, the tapered end portion 38a of the connecting element 36 may have a relatively steep taper throughout, the tapered ends 54a, 58a of the intermediate and outer thickness bands 48a, 52a of the spar cap 30 may similarly have a relatively steep taper, and the tapered end 56a of the inner thickness band 50a of the spar cap 30 may have a relatively shallow taper.

In preferred examples, each of the spar cap 30 and connecting element 36 preferably has at least one thickness band 50a, 50b, 52a, 52b having a tapered end 56a, 56b, 58a, 58b with a lower rate of taper than the tapered end 54a, 54b of the respective intermediate thickness band 48a, 48b of the spar cap 30 or connecting element 36. More preferably, at least one of the inner or outer thickness bands 50a, 52a of the spar cap 30 has a tapered end 56a, 58a with a lower rate of taper than the intermediate thickness band tapered end 54a, and additionally at least the other of the inner or outer thickness bands 50b, 52b of the connecting element 36 has a tapered end 56b, 58b with a lower rate of taper than the intermediate thickness band tapered end 54b. As such, the modular wind turbine blade preferably comprises at least one inner thickness band 50 having a tapered end 56 with a lower rate of taper than the tapered end 54 of an intermediate thickness portion 48, and at least one outer thickness band 52 having a lower rate of taper than the tapered end 54 of an intermediate thickness band 48.

However, in more preferred examples, the tapered end portion 32 of the spar cap 30 and the tapered end portion 38 of the connecting element 36 have a complementary shape, as shown in FIGS. 3 and 5 for example. That is to say, the tapered ends 56 of the inner thickness bands 50 of both the spar cap 30 and the connecting element 36 preferably have a lower rate of taper than the tapered ends 54 of the respective intermediate thickness bands 48 of the spar cap and connecting element 30, 36. Additionally or alternatively, the tapered ends 58 of the outer thickness bands 52 of both the spar cap 30 and the connecting element 36 preferably have a lower rate of taper than the tapered ends 54 of the respective intermediate thickness bands 48 of the spar cap 30 and connecting element 36. In the most preferred examples, the inner thickness bands 50 of the spar cap 30 and connecting element 36 have complementary tapered ends 56, and the outer thickness bands 52 of the spar cap 30 and connecting element 36 also have complementary tapered ends 58.

Further, in the example shown in FIG. 1, the tapered end portion 32a of the first spar cap 30a defines a tapered recess 42a in the first blade module 12a, and the tapered end portion 32b of the second spar cap 30b extends from the second blade module 12b. However, in some other examples, the modular wind turbine blade 10 may comprise first and second spar caps 30a, 30b that both extend from their respective blade modules 12a, 12b. That is to say, the modular blade 10 may comprise a first blade module 12a having a first spar cap 30a with a tapered end portion 32a that extends from the first blade module 12a, and a second blade module 12b with a second spar cap 30b having a tapered end portion 32b that also extends from the second blade module 12b. The tapered end portions 32a, 32b of the first and second spar caps 30a, 30b in such an example are preferably mutually opposed and connected by a connecting element 36, such as a spar bridge, that forms scarf joints 14 with both the first and second spar caps 30a, 30b as previously described. In such an example, a fairing (not shown) may be provided around the part of the blade 10 comprising the joints 14 and the connecting element 36.

It will be appreciated that the first and second blade modules 12a, 12b may each comprise a plurality of spar caps 30. However, for conciseness only a first spar cap 30a of the first blade module 12a, and a second spar cap 30b of the second blade module 12b, are described herein. It will be appreciated that the description provided in relation to the first and second spar caps 30a, 30b is equally applicable to any other pair of spar caps 30 that are connected when assembling the modular wind turbine blade 10.

Further, whilst the description above has been provided primarily in relation to the joint 14 between the first spar cap 30a and the connecting element 36, it will be appreciated that any description of the joint 14, and features of the spar cap 30a and connecting element 36, is equally applicable to a joint 14 between the second spar cap 30b and the connecting element 36 for examples wherein the first and second spar caps 30a, 30b are connected via a separate connecting element 36.

It will be appreciated that the description provided above serves to demonstrate a plurality of possible examples of the present invention. Features described in relation to any of the examples above may be readily combined with any other features described with reference to different examples without departing from the scope of the invention as defined in the appended claims.

The invention claimed is:

1. A modular wind turbine blade comprising:
   first and second blade modules connectable together to form at least part of the wind turbine blade;
   each blade module comprising an outer shell defining a pressure side and a suction side of the wind turbine blade,
   the first blade module comprising a first spar cap, and the second blade module comprising a second spar cap;
   the first spar cap having a tapered end portion in which a thickness of the first spar cap decreases towards an end of the first spar cap;
   an elongate connecting element for connecting the first and second blade modules together, the connecting element having a first tapered end portion in which a thickness of the connecting element decreases towards a first end of the connecting element, the first tapered end portion being configured for bonding to the tapered end portion of the first spar cap;
   the first spar cap having an inner surface and an outer surface, the thickness being defined between the inner surface and the outer surface, the first spar cap comprising (i) an intermediate thickness band; (ii) an inner thickness band between the intermediate thickness band and the inner surface; and (iii) an outer thickness band between the intermediate thickness band and the outer surface, each of the thickness bands having a tapered end within the tapered end portion of the first spar cap;
   the connecting element having an inner surface and an outer surface, the thickness of the connecting element being defined between the inner surface and the outer surface, the connecting element comprising (i) an intermediate thickness band; (ii) an inner thickness band between the intermediate thickness band and the inner surface and (iii) an outer thickness band between the intermediate thickness band and the outer surface, each of the thickness bands having a tapered end within the first tapered end portion of the connecting element;
   wherein the tapered end of the inner thickness band and/or the tapered end of the outer thickness band of the first spar cap has a lower rate of taper than the tapered end of the intermediate thickness band of the first spar cap; and/or
   wherein the tapered end of the inner thickness band and/or the tapered end of the outer thickness band of the connecting element has a lower rate of taper than the tapered end of the intermediate thickness band of the connecting element.

2. The modular wind turbine blade of claim 1, wherein the connecting element comprises a tapered end portion of the second spar cap extending from the second blade module.

3. The modular wind turbine blade of claim 1, wherein the second spar cap has a tapered end portion, and wherein the connecting element is separate from the first and second blade modules and further comprises a second tapered end portion, the first and second tapered end portions of the connecting element being configured for bonding to the respective tapered end portions of the first and second spar caps.

4. The modular wind turbine blade of claim 1, wherein the inner and/or outer thickness band of the first spar cap each have a thickness of between 5% to 25% of the thickness of the first spar cap, and the intermediate thickness band of the first spar cap has a thickness of between 50% to 90% of the thickness of the first spar cap, and/or wherein the inner and/or outer thickness band of the connecting element each have a thickness of between 5% to 25% of the thickness of the connecting element, and the intermediate thickness band of the connecting element has a thickness of between 50% to 90% of the thickness of the connecting element.

5. The modular wind turbine blade of claim 1, wherein the first spar cap and/or the second spar cap and/or the connecting element comprise a stack of layers.

6. The modular wind turbine of claim 5, wherein the stack of layers are pultrusions.

7. The modular wind turbine blade of claim 5, wherein the intermediate thickness band of the first spar cap comprises more layers than the inner thickness band of the first spar cap and/or more layers than the outer thickness band of the first spar cap, and/or wherein the intermediate thickness band of the connecting element comprises more layers than the inner thickness band of the connecting element and/or more layers than the outer thickness band of the connecting element.

8. The modular wind turbine blade of claim 5, wherein the inner thickness band of the first spar cap and/or the outer thickness band of the first spar cap comprises a single layer, and the intermediate thickness band of the first spar cap comprises a plurality of layers, and/or wherein the inner thickness band of the connecting element and/or the outer thickness band of the connecting element comprises a single layer, and the intermediate thickness band of the connecting element comprises a plurality of layers.

9. The modular wind turbine blade of claim 5, wherein each layer of the inner and/or outer thickness band of the first spar cap tapers over a longer spanwise length than each layer of the intermediate thickness band of the first spar cap, and/or wherein each layer of the inner and/or outer thickness band of the connecting element tapers over a longer spanwise length than each layer of the intermediate thickness band of the connecting element.

10. The modular wind turbine blade of claim 1, wherein the tapered end of the inner thickness band and/or the tapered end of the outer thickness band of the first spar cap defines a curved taper, and/or wherein the tapered end of the inner thickness band and/or the tapered end of the outer thickness band of the connecting element defines a curved taper.

11. The modular wind turbine blade of claim 1, wherein the tapered end of the inner thickness band of the first spar cap defines a curved taper that is complimentary curved to a curved taper of the tapered end of the inner thickness band of the connecting element, and/or wherein the tapered end of the outer thickness band of the first spar cap defines a curved taper that is complimentary curved to a curved taper of the tapered end of the outer thickness band of the connecting element.

12. The modular wind turbine blade of claim 1, wherein the tapered end of the intermediate thickness band of the first spar cap defines a linear taper, and/or wherein the tapered end of the intermediate thickness band of the connecting element defines a linear taper.

13. The modular wind turbine blade of claim 1, wherein the tapered ends of the inner, outer and intermediate thickness bands of the first spar cap together define a S-shaped or Z-shaped profile at the end of the first spar cap, and/or wherein the tapered ends of the inner, outer and intermediate thickness bands of the connecting element together define a S-shaped or Z-shaped profile at the first end of the connecting element.

14. The modular wind turbine blade of claim 1, further comprising an outer patch applied over an interface between the outer thickness band of the connecting element and the outer thickness band of the first spar cap, and/or an inner patch applied over an interface between the inner thickness band of the connecting element and the inner thickness band of the first spar cap.

15. The modular wind turbine blade of claim 14, wherein the outer patch and/or the inner patch comprises a stack of plies of fibrous reinforcing material.

* * * * *